(12) United States Patent
Fischer et al.

(10) Patent No.: US 11,229,024 B2
(45) Date of Patent: Jan. 18, 2022

(54) MINIMUM ALLOCATION SIGNALING

(71) Applicant: Avago Technologies International Sales Pte. Limited, Singapore (SG)

(72) Inventors: Matthew James Fischer, Mountain View, CA (US); Zhou Lan, Fremont, CA (US); Chunyu Hu, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 14 days.

(21) Appl. No.: 16/599,052

(22) Filed: Oct. 10, 2019

(65) Prior Publication Data

US 2020/0128522 A1    Apr. 23, 2020

Related U.S. Application Data (60) Provisional application No. 62/748,157, filed on Oct. 19, 2018.

(51) Int. Cl.
| | |
|---|---|
| *H04L 5/00* | (2006.01) |
| *H04W 72/04* | (2009.01) |
| *H04W 52/02* | (2009.01) |
| *H04W 72/08* | (2009.01) |
| *H04W 48/16* | (2009.01) |

(52) U.S. Cl.
CPC ......... *H04W 72/044* (2013.01); *H04L 5/0037* (2013.01); *H04W 48/16* (2013.01); *H04W 52/0216* (2013.01); *H04W 72/082* (2013.01)

(58) Field of Classification Search
CPC ............................ H04L 5/0037; H04W 48/16; H04W 52/0216; H04W 72/044; H04W 72/082
USPC ......................................................... 370/254
See application file for complete search history.

(56) References Cited

U.S. PATENT DOCUMENTS

| | | | |
|---|---|---|---|
| 2016/0014813 A1* | 1/2016 | Seok | H04W 74/0816 370/336 |
| 2017/0230964 A1* | 8/2017 | Park | H04B 7/0452 |
| 2018/0077723 A1* | 3/2018 | Adachi | H04L 12/189 |
| 2019/0098565 A1* | 3/2019 | Cherian | H04W 48/18 |

* cited by examiner

*Primary Examiner* — Gbemileke J Onamuti
(74) *Attorney, Agent, or Firm* — Morgan, Lewis & Bockius LLP (57) ABSTRACT

A wireless communication system for minimum allocation includes an access point (AP) and a number of stations (STAs) communicating with the AP via a network such as a wireless local area network. The AP can identify an STA to which a trigger frame is to be sent by the AP. The AP further determines the amount of resources to be provided by the AP to the identified STA through the trigger frame. The AP can also determine a frequency of sending the trigger frame to the STA. The resources can include a frequency allocation, a time duration and a modulation coding scheme. The time duration is a maximum receive (RX) physical-layer convergence protocol (PLCP) protocol data unit (PPDU) duration.

15 Claims, 11 Drawing Sheets

| 700 | 710 | 720 | 730 | 740 |
|---|---|---|---|---|
| | Control ID Value | Meaning | Length of the Control Information Subfield (bits) | Content of the Control Information subfield |
| | 0 | Triggered response scheduling (TRS) | 26 | See 9.2.4.6a.1 (TRS Control) |
| | 1 | operating mode (OM) | 12 | See 9.2.4.6a.2 (OM Control) |
| | 2 | HE link adaptation (HLA) | 26 | See 9.2.4.6a.3 (HLA Control) |
| | 3 | Buffer status report (BSR) | 26 | See 9.2.4.6a.4 (BSR Control) |
| | 4 | UL power headroom (UPH) | 8 | See 9.2.4.6a.5 (UPH Control) |
| | 5 | Bandwidth query report (BQR) | 10 | See 9.2.4.6a.6 (BQR Control) |
| | 6 | Command and status (CAS) | 8 | See 9.2.4.6a.7 (CAS Control) |
| | 7 | Maximum RX PPDU Duration (MPD) (#15757) | 26 | See 9.2.4.6a.7a (MPD Control) |
| | 78-15 | Reserved | | |

710

| | B0　　B4 | B5　　B25 |
|---|---|---|
| | Maximum RX PPDU Duration | DL UL Control |
| Bits: | 5 | 21 |

| Control ID Value | Meaning | Length of the Control Information Subfield (bits) | Content of the Control Information subfield |
|---|---|---|---|
| 0 | Triggered response scheduling (TRS) | 26 | See 9.2.4.6a.1 (TRS Control) |
| 1 | operating mode (OM) | 12 | See 9.2.4.6a.2 (OM Control) |
| 2 | HE link adaptation (HLA) | 26 | See 9.2.4.6a.3 (HLA Control) |
| 3 | Buffer status report (BSR) | 26 | See 9.2.4.6a.4 (BSR Control) |
| 4 | UL power headroom (UPH) | 8 | See 9.2.4.6a.5 (UPH Control) |
| 5 | Bandwidth query report (BQR) | 10 | See 9.2.4.6a.6 (BQR Control) |
| 6 | Command and status (CAS) | 8 | See 9.2.4.6a.7 (CAS Control) |
| 7 | Maximum RX PPDU Duration (MPD) (#15757) | 26 | See 9.2.4.6a.7a (MPD Control) |
| 78-15 | Reserved | | |

| B0    B4 | B5    B25 |
|---|---|
| Maximum RX PPDU Duration | DL UL Control |
| Bits: 5 | 21 |

FIG. 11

MINIMUM ALLOCATION SIGNALING

CROSS-REFERENCE TO RELATED APPLICATIONS

This application claims the benefit of priority under 35 U.S.C. § 119 from U.S. Provisional Patent Application 62/748,157, filed Oct. 19, 2018, which is incorporated herein by reference in its entirety.

TECHNICAL FIELD

The present description relates in general to wireless communications, more particularly, for example, without limitation, to minimum allocation signaling.

BACKGROUND

Wireless local area network (WLAN) devices are deployed in diverse environments. These environments are generally characterized by the existence of access points (APs) and non-AP stations. Next-generation WLAN devices are expected to improve performance in dense deployments where many clients and APs are overpopulated in a given area (e.g., an indoor and/or an outdoor area) with a high density of devices, such as a train station, an airport, a stadium, a building, a shopping mall, an arena, a convention center, a college or a downtown city center. Increased interference from neighboring WLAN devices can give rise to performance degradation. Additionally, WLAN devices are increasingly required to support a variety of applications such as video, cloud access, and offloading application.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Certain wireless communication systems, such as wireless local area networks (WLAN) (e.g., the institute of electrical and electronics engineers (IEEE) 802.11 specification), provide high-bandwidth and lower-latency communication mediums. An aspect of the 802.11 specification is that there is a significant amount of overhead contending for the medium. In a carrier-sense multiple-access/collision-avoidance (CSMA/CA) mechanism, every wireless communication device has to contend for the medium and avoid any collisions. Every time there is a collision, any one of the wireless communication devices has to do a random back off and wait for the next transmit opportunity. This mechanism adds a lot of overhead to the system. Along with this is additional header information for every packet, which adds to the overhead. With features recently added to the 802.11 specification, any one of the wireless communication devices can aggregate medium-access control (MAC) service data units (MSDUs) and MAC protocol data units (MPDUs) into one data packet. Once the medium is granted, a block of data can be transferred in one transmission. This can lower the header overhead, and improve the overall efficiency.

The subject technology provides for allowing a non-access-point (AP) station (STA) to signal a desired minimum allocation for the AP to deliver to the STA within a trigger, for a given access category (AC). A trigger is a type of 802.11 MAC frame that is transmitted by an AP to a set of non-AP STAs to elicit uplink (UL) transmit (TX) from those STAs. Each STA in the set is allocated at least one resource unit (RU) and one or more of a duration of the UL TX (all STAs receive the same duration value), a modulation coding scheme (MCS) to use for the UL TX, a receive (RX) power to be targeted at the AP RX antenna for the UL TX and a spatial stream allocation (e.g., an orthogonal spatial dimension). An AP desires to control medium access by providing trigger frames to non-AP STAs. The AP has to determine the non-AP STAs to be triggered for UL TX for each trigger that it transmits, the amount of resource to be provided to each non-AP STA within each trigger and the frequency of directing the trigger toward each non-PAN STA (e.g., every 10 milliseconds (ms), every 20 ms or more often). Example of resource include frequency allocation, also known a resource allocation (RA), time duration and the MCS.

In order for the AP to determine the above-listed parameters, the AP has to collect information from the non-AP STAs (e.g., the non-AP STA TX buffer status and the number of bytes pending for TX UL to the AP) and the non-AP STA TX MCS selection to the AP (e.g., the expected bits/sec/Hz for a transmission from the non-AP STA to the AP). The AP examines collected information and combines it with other information, for example, the time of last UL transmission from the non-AP STA to the AP, the number of bytes in the last UL transmission from the non-AP STA to the AP, the amount of time allocated for the last UL transmission from the non-AP STA to the AP, the long-term average bytes/sec UL TX from the non-AP STA to the AP and the long-term average MCS UL TX from the non-AP STA to the AP. Finally the AP combines all information for all of the non-AP STAs in order to make scheduling decisions, for example, to determine frequency of triggers directed toward each STA and to determine the per-non-AP STA UL TX parameters within each trigger.

The AP is typically informed of the total pending UL TX data at each of the non-AP STAs. The AP is not informed of the typical packet unit available for UL TX at each non-AP STA. The AP can provide a trigger that specifies, for any given non-AP STA, a combination of the various TX parameters. Examples of the TX parameters include the duration of the UL TX, the MCS of UL TX, and the RA (e.g., frequency allocation) of the UL TX. These specifications results in a total maximum number of bits that can be carried in the triggered UL TX, which might be smaller than the size of the packet available for transmission at the targeted non-AP STA. Such a failure results in no transmission being performed by the non-AP STA or a transmission of a null frame. In either case, the allocation of time and frequency is wasted, resulting in lowered system efficiency.

In some aspects, the subject system creates a mechanism to signal the minimum PSDU allocation needed by a non-AP STA within a trigger sent by an AP, using a new subfield, such as a Maximum RX PPDU Duration (MPD) control subfield. In some examples, an STA may transmit a frame, including, but not limited to, a quality-of-service (QoS) null frame, to its associated AP that contains an MPD control subfield to specify a value of a minimum PSDU allocation for an AC.

Figure 1:
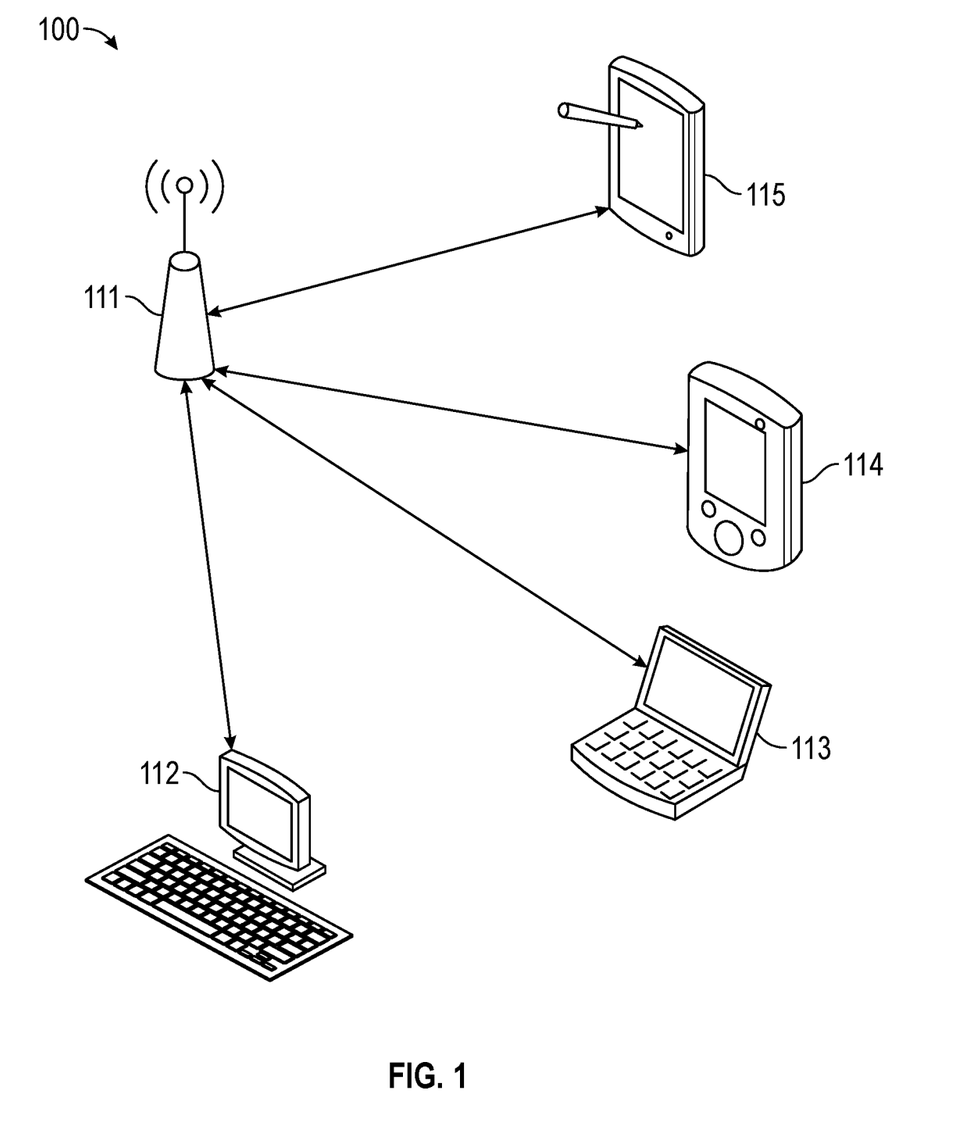
FIG. 1 is a schematic diagram illustrating an example of a wireless communication network.

FIG. 1 illustrates a schematic diagram of an example of a wireless communication network 100. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In the wireless communication network 100, such as a WLAN, a basic service set (BSS) includes a plurality of wireless communication devices (e.g., WLAN devices). In one aspect, a BSS refers to a set of STAs that can communicate in synchronization, rather than a concept indicating a particular area. In this example, the wireless communication network 100 includes wireless communication devices 111-115, which may be referred to as STAs.

Each of the wireless communication devices 111-115 may include a MAC layer PHY according to an IEEE 802.11 standard. In this example, at least one wireless communication device (e.g., device 111) is an AP. The AP may be referred to as an AP STA or an AP device.

The other wireless communication devices (e.g., devices 112-115) may be non-AP STAs. Alternatively, all of the wireless communication devices 111-115 may be non-AP STAs in an adhoc networking environment.

An AP STA and a non-AP STA may be collectively called STAs. However, for simplicity of description, in some aspects only a non-AP STA may be referred to as a STA. An AP may be, for example, a centralized controller, a base station (BS), eNode-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a nonmobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In response to a trigger frame transmitted by an AP, an STA that transmits an uplink frame (e.g., high-efficiency (HE) trigger-based (TB) physical layer convergence protocol (PLCP) protocol data unit (PPDU)) may include at least one MPDU in an aggregated MPDU (A-MPDU). If the STA has no frames pending or is unable to include pending frames because the allocated resource is insufficient, then the STA may include a QoS null frame with any traffic identifier (TID) and with an acknowledgment policy field (e.g., No Ack). In some implementations, the AP ensures that it allocates sufficient space for a QoS null frame.

In some implementations, an AP may use a QoS control field in a MAC) header of each MPDU and a control field in a payload of a downlink (DL) frame to notify an STA (that has a payload in the DL frame) about a sub-band that the STA should use to place its response frame (e.g., acknowledgment (ACK)) or block acknowledgment (BA) frame in the immediately multiplexed-ACK/BA frame. To do so, for each payload in a DL MU frame, an AP uses an aggregated control (A-control) subfield in the MAC header of a frame and fills the designated subfield with the allocated resource that the STA should use to send its ACK or BA frame. The subject system creates a mechanism to signal the minimum PSDU Allocation needed by a non-AP STA within a trigger sent by an AP, using an access-category (AC), within a new MPD subfield. In some examples, an STA may transmit a frame, including, but not limited to a QoS null frame, to its associated AP that contains an MPD control subfield to specify a value of a minimum PSDU allocation for an AC.

The A-control subfield may include a control subfield. The control subfield may include a control identifier (ID) subfield. In some implementations, the control ID subfield includes an additional field called an MPD subfield that may contain a minimum PSDU allocation subfield, a maximum RX PPDU Duration subfield, an ACI subfield and a Maximum PSDU allocation subfield. The length of the minimum PSDU allocation subfield may be about 16 bits, but may vary depending on implementation. In one or more implementations, if the control ID subfield in a control subfield of an AC subfield corresponds to a predetermined value (e.g., 7), then the control information subfield of the control subfield contains the MPD control subfield. The value of the AC index (ACI) references the AC to which the MPD is applicable. The MPD subfield may contain a minimum PSDU allocation subfield that is an unsigned integer that is the minimum number of octets that the transmitting STA requires its allocation within a trigger frame to support.

An AP that transmits a trigger frame that specifies an RU to an STA for a preferred AC may specify subfield settings of the common information field and subfield settings of the user information field (or station-specific field) for that STA, which together describe an HE TB PPDU that is sufficient to hold at least N octets of payload, where N is equal to the value of the minimum PSDU allocation MPD subfield of the most recently received MPD control field from the STA that corresponds to the preferred AC. If no MPD control field corresponding to the preferred AC has been received from the STA, then N is equal to 0 or to any arbitrary value that the AP deems appropriate. The "HE TB PPDU" generally refers to a frame transmitted by a non-AP STA (in the role of a transmission opportunity (TXOP) responder) in response to a trigger frame or frame that includes a triggered response scheduling (TRS) control field sent by the AP. In some implementations, more than one HE TB PPDU may be transmitted simultaneously by more than one non-AP STA.

Figure 2:
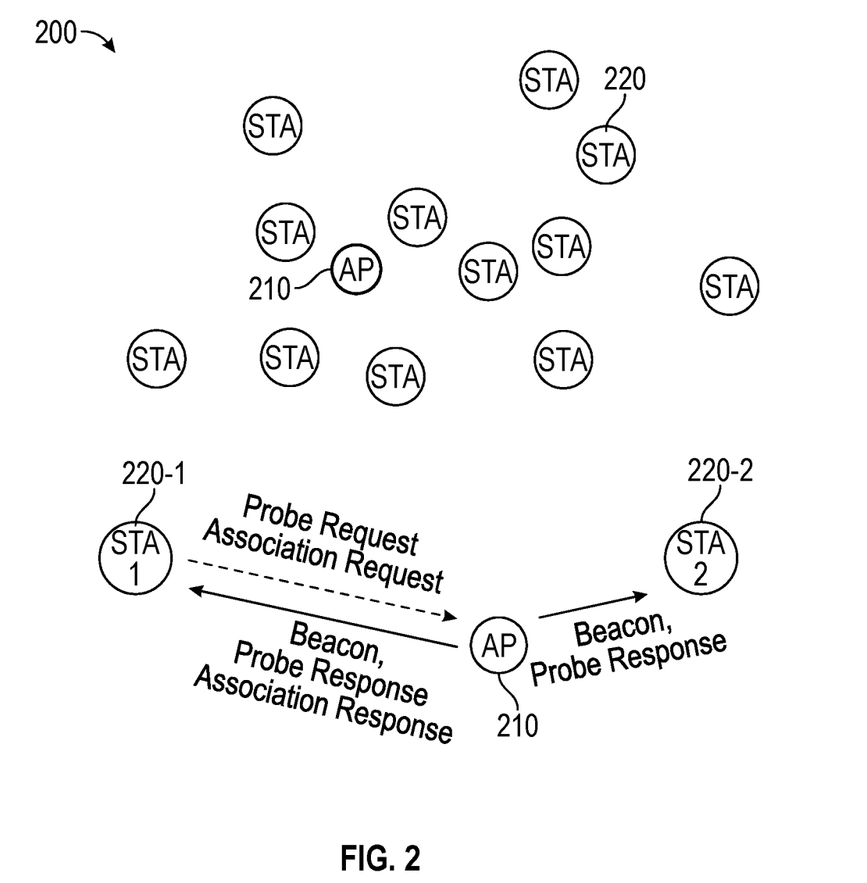
FIG. 2 is a schematic diagram illustrating an example of a wireless local area network (WLAN).

FIG. 2 is a schematic diagram illustrating an example of a WLAN 200. The WLAN 200 includes an AP 210 and several associated non-AP STAs 220. During the discovery and link establishment, the non-AP STAs 220 have to discover APs and choose among the discovered APs and establish a link with the chosen AP. For example, the non-AP STA 220-1 (STA1) and 220-2 (STA2) may receive beacon frames from the AP 210 introducing itself. The non-AP STAs 220-1 and 220-2 then may transmit a probe request frame to solicit probe response, and in response receive probe response frames from the AP 210.

Next, the non-AP STAs 220-1 and 220-2 transmit association requests to the AP 210. In response, the AP 210 transmits association response frames to the non-AP STAs 220-1 and 220-2. Each of these frames can possibly include a signaling of the capability of understanding a minimum PSDU allocation (e.g., zero) indication. The non-AP STAs 220-1 and 220-2 may use a minimum PSDU allocation field to inform the AP 210 of a lower limit amount of bytes that an allocation for UL TX, within a trigger frame, should contain for those non-AP STAs. If a minimum PSDU allocation number of bytes has been specified by a non-AP STA (e.g., 210-1), the trigger transmitted by the AP 210 to that non-AP STA with a resource allocation, which provides frequency, time and other resources combined, should not allow fewer than the specified minimum PSDU allocation bytes to be transmitted by the non-AP STA.

Figure 3:
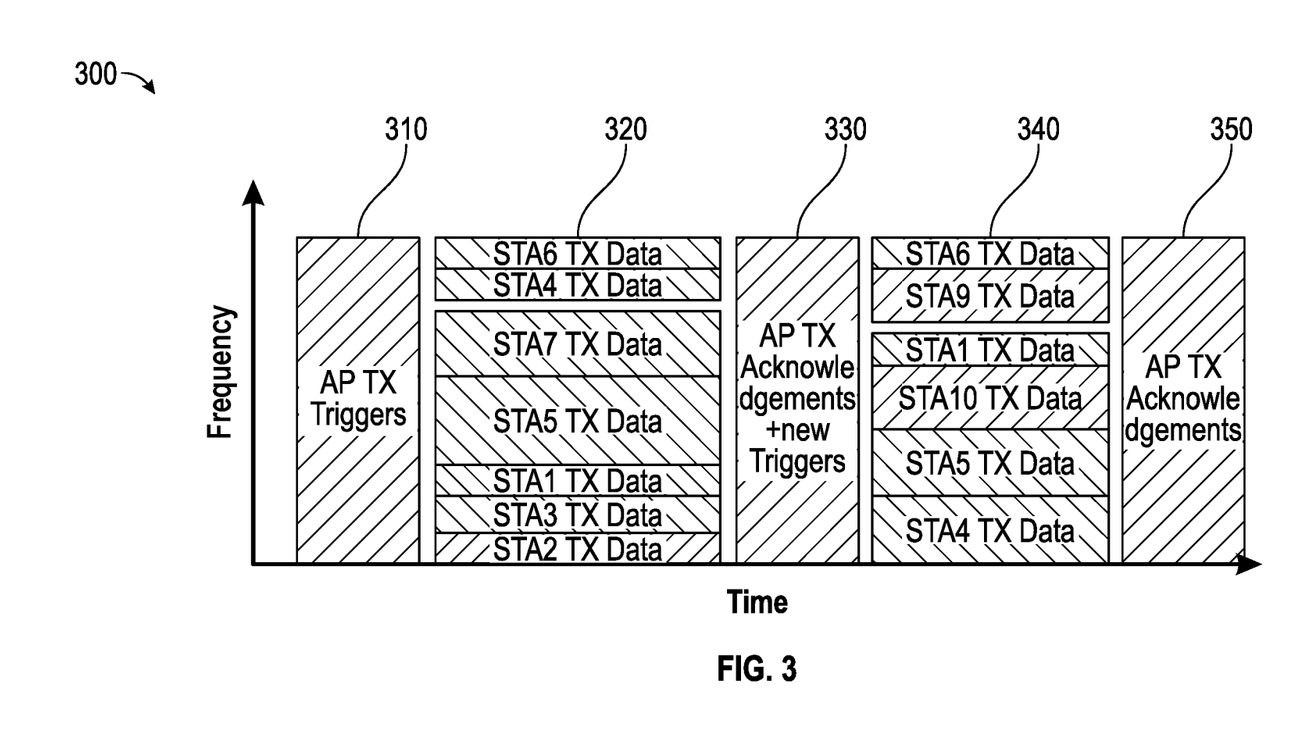
FIG. 3 a schematic diagram illustrating an example access point (AP) trigger scheme with multiple non-AP stations, in accordance with one or more implementations of the subject technology.

FIG. 3 a schematic diagram illustrating an example AP trigger scheme 300 with multiple non-AP stations, in accordance with one or more implementations of the subject technology. The trigger scheme 300 is a time chart showing consequent periods 310, 320, 330, 340 and 350. In the period 310, the AP transmits triggers to a first group of non-AP STAs. In response to the trigger, within the period 320, the non-AP STAs (STA1, STA2, STA3, STA4, STA5, STA6 and STAT) send their respective data in different frequency channels, which may have differing channel widths. In the period 330, the AP transmits triggers to a second group of non-AP STAs. In response to the trigger, within the period 340, the non-AP STAs (STA1, STA4, STA5, STA6, STA9 and STA10) send their respective data in different frequency channels with differing channel widths. Each trigger transmitted by the AP can specify a different total duration of UL TX, and the data transmissions by various non-AP STAs may differ in frequency, bandwidth, data rate (bits/sec/Hz) and encoding.

Figure 4:
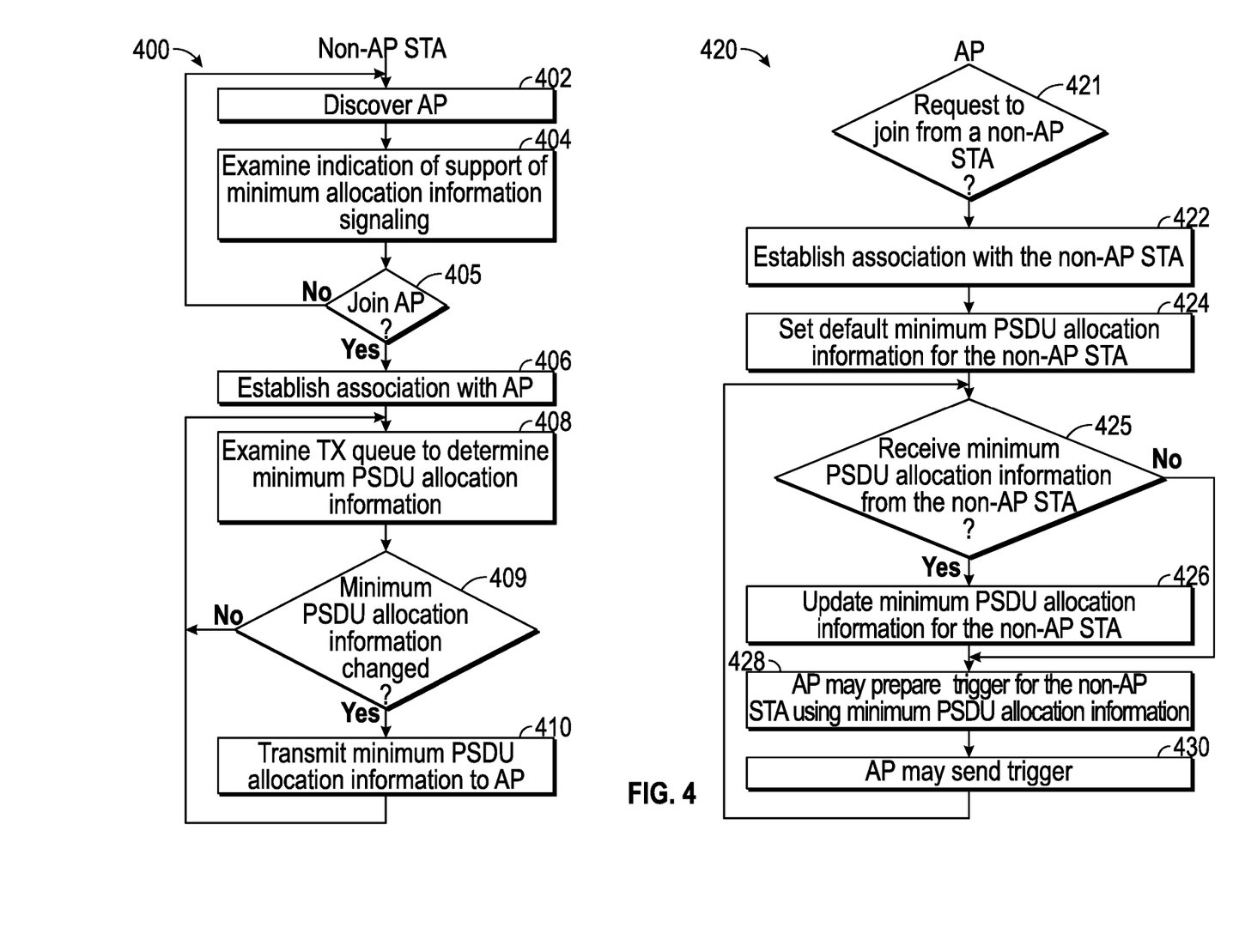
FIG. 4 illustrates flow diagrams of example use of minimum allocation information for a non-AP station and an AP, in accordance with one or more implementations of the subject technology.

FIG. 4 illustrates flow diagrams 400 and 420 of an example use of minimum PSDU allocation information for a non-AP station and an AP, in accordance with one or more implementations of the subject technology. The flow diagram 400 describes activities of a non-AP STA e.g., 220 of FIG. 2, hereinafter "STA") and starts at operation block 402, where the STA tries to discover an AP (e.g., 210 of FIG. 2). Following the discovery of the AP, the STA, at operation block 404, examines an indication of the support of the minimum PSDU allocation information signaling by the AP. At control operation block 405, the STA decides whether to join the discovered AP. If the decision is to not join the AP, the control is passed to operation block 402. Otherwise, the STA proceeds with establishing association with the AP (operation block 406). Next, at operation block 408, the STA examines the TX queue to determine the minimum PSDU allocation information. At control operation block 409, the STA determines whether the minimum PSDU allocation information has changed. If the answer is no, the control is passed to the operation block 408. Otherwise, at operation block 410 the STA transmits the minimum PSDU allocation information to the AP.

The flow diagram 420 describes activities of an AP (e.g., 210 of FIG. 2) and starts at operation block 421, where the AP establishes an association with an STA (e.g., 220 of FIG. 2). Following the establishment of the association, the AP, at operation block 422, sets a default minimum PSDU allocation information for the STA. At control operation block 425, the AP checks whether the minimum PSDU allocation information is received from the STA. In case the answer is no, the control is passed to operation block 428. Otherwise, the AP proceeds with updating the minimum PSDU allocation information for the STA (operation block 426). Next, at operation block 428, the AP prepares a trigger for the STA using the minimum PSDU allocation information. Finally, at operation block 430, the AP sends the prepared trigger to the STA.

Figure 5:
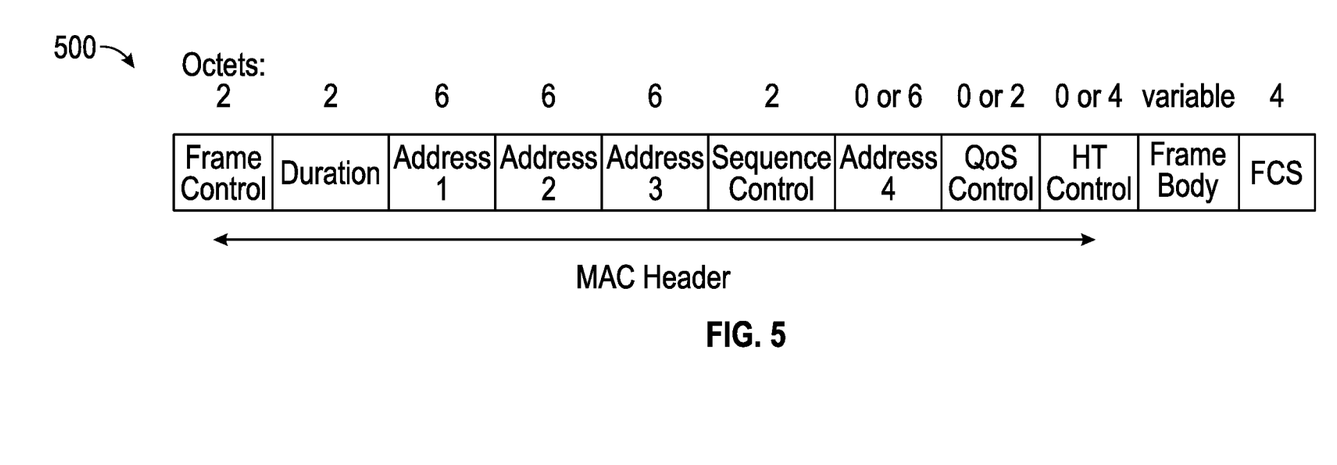
FIG. 5 illustrates a structure of an example frame indicating minimum physical-layer convergence protocol (PLCP) service data unit (PSDU) allocation information, in accordance with one or more implementations of the subject technology.

FIG. 5 illustrates a structure of an example frame 500 indicating minimum PSDU allocation information, in accordance with one or more implementations of the subject technology. The frame 500 includes a number of fields with deferring octets shown above those fields. The fields include a MAC header section consisting of a frame control field, a duration field, four address fields (address 1, address 2, address 3 and address 4), a sequence control field, a QoS control field, a high-throughput (HT) control field, a frame body field and a frame check sequence (FCS) field. The minimum PSDU allocation information is included in the MAC header section, in the flexible HT control field, within the HE variant of the HT control field.

The minimum PSDU allocation information is specific to a class of traffic, and the class of traffic refers to an AC such as, AC_BK=background, AC_BE=best effort, AC_VI=video and video-like traffic and AC_VO=voice and voice-like traffic. The applicable traffic class is included elsewhere in the Maximum RX PPDU Duration subfield of the frame that contains the minimum PSDU allocation information.

Figure 6:
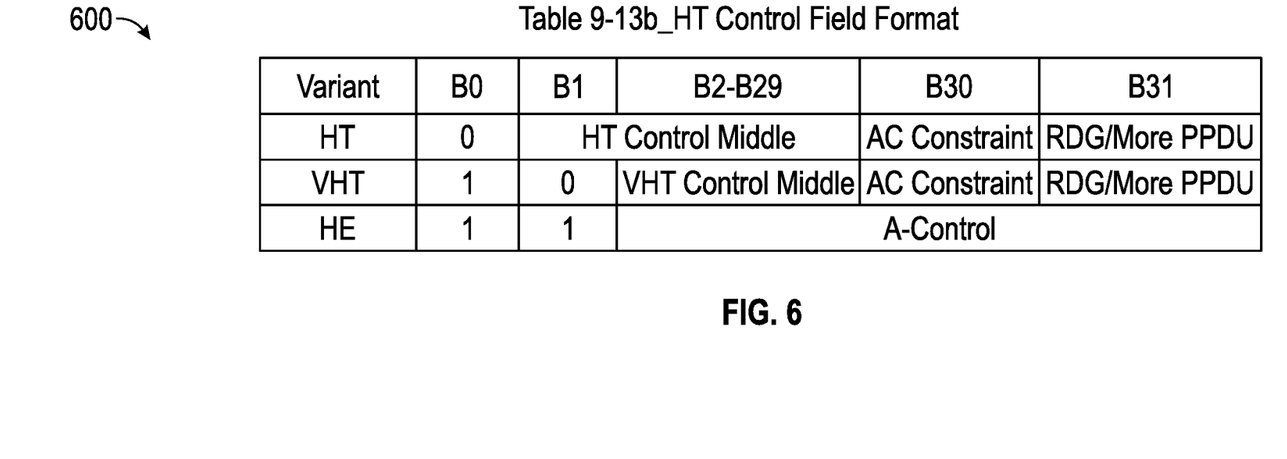
FIG. 6 illustrates a table indicating a high-throughput (HT) control-field format, in accordance with one or more implementations of the subject technology.

FIG. 6 illustrates a table 600 indicating an HT control-field format, in accordance with one or more implementations of the subject technology. The HT control field has three variants, HT, VHT and HE, for which the bit information details are provided in table 600.

Figure 7:
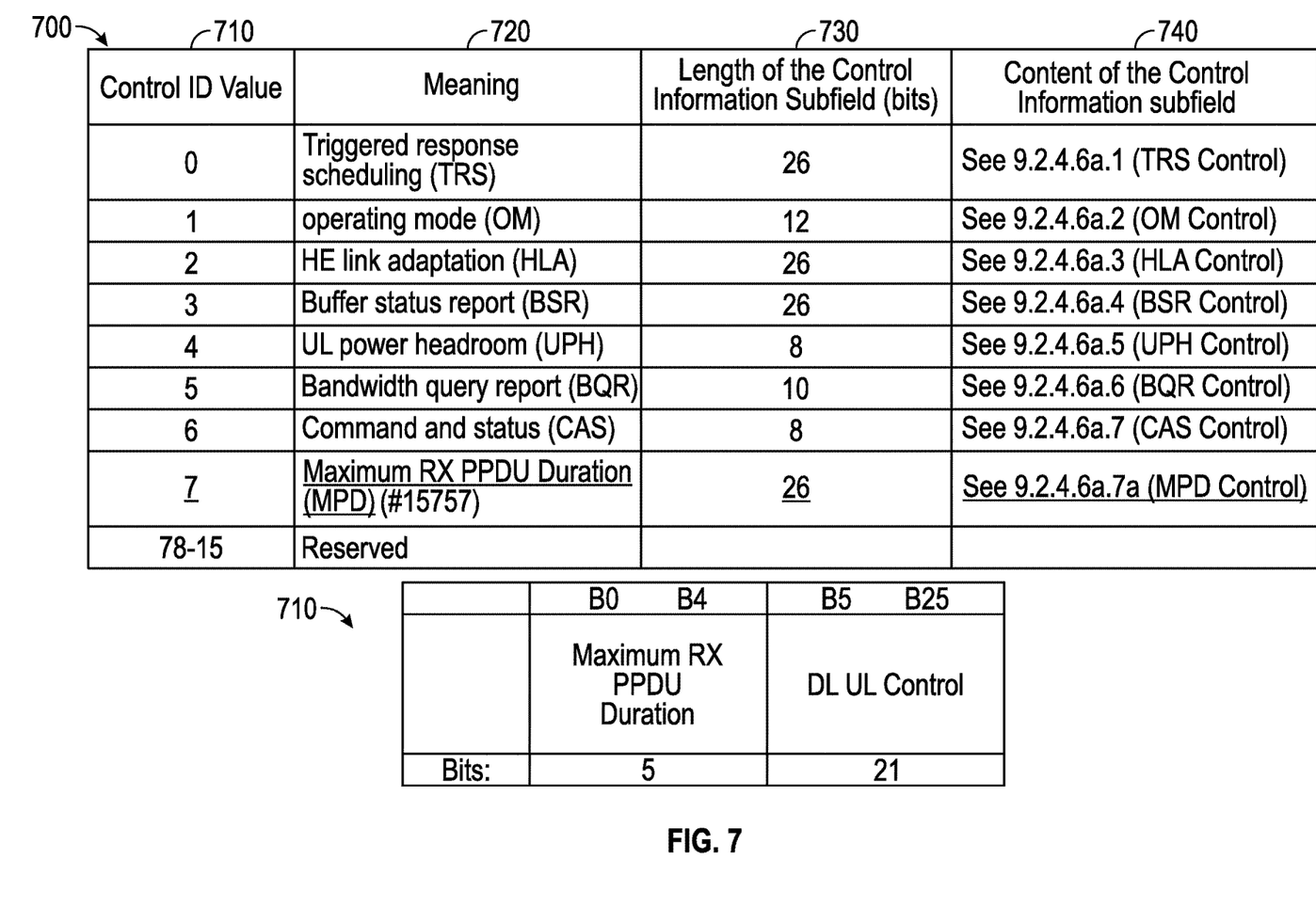
FIG. 7 illustrates tables indicating control identifier (ID) value definitions and example control information, respectively, in accordance with one or more implementations of the subject technology.

FIG. 7 illustrates tables 700 and 710 indicating control ID value definitions and example control information, respectively, in accordance with one or more implementations of the subject technology. Table 700 has four columns 710, 710, 730 and 740. Column 710 gives a number of control ID values (0 through 15), of which values 8-15 are reserved. Column 720 provides a description of the control values of column 710. Column 730 lists the length of control information subfield for each of the control ID values, and column 740 provides the content of each respective control information subfield.

Table 710 provides examples of control information for a control ID value of 7, including the number of bit allocations to the maximum RX PPDU duration (e.g., hundreds of µs, such as about 512 µs) and DL UL control subfields. When the HT control fields B0 and B4 are both equal to 1, then the remaining 30 bits are defined as A-control. The A-control field is a sequence of control lists, and the control list is a 4-bit control ID with a variable amount of control information.

Figure 8:
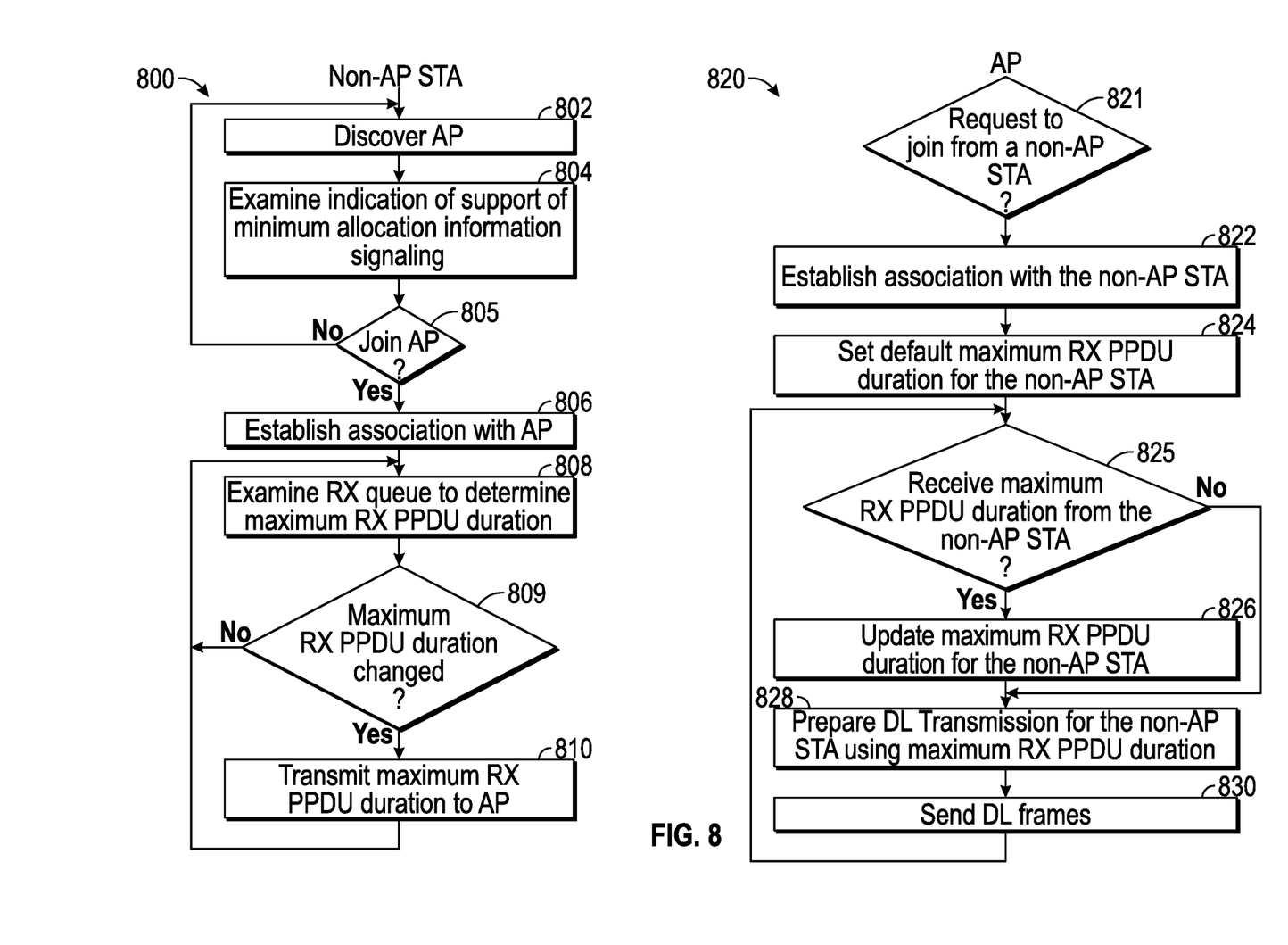
FIG. 8 illustrates flow diagrams of an example use of maximum receive (RX) PLCP protocol data unit (PPDU) duration for a non-AP station and an AP, in accordance with one or more implementations of the subject technology.

FIG. 8 illustrates flow diagrams 800 and 820 of an example use of maximum RX PPDU duration for a non-AP station and an AP, in accordance with one or more implementations of the subject technology. The flow diagram 800 describes the use of the maximum RX PPDU duration by a non-AP STA (e.g., 220 of FIG. 2) and starts at operation block 802, where the STA tries to discover an AP (e.g., 210 of FIG. 2). Following the discovery of the AP, the STA, at operation block 804, examines an indication of the support of the minimum allocation information signaling by the AP. At control operation block 805, the STA decides whether to join the discovered AP. If the decision is to not join the AP, the control is passed to operation block 802. Otherwise, the STA proceeds with establishing association with the AP (operation block 806). Next, at operation block 808, the STA examines the RX queue to determine the maximum RX PPDU duration. At control operation block 809, the STA determines whether the maximum RX PPDU duration has changed. If the answer is no, the control is passed to the operation block 808. Otherwise, at operation block 810, the STA transmits the maximum RX PPDU duration to the AP.

The flow diagram 820 describes the use of the maximum RX PPDU duration by an AP (e.g., 210 of FIG. 2) and starts at control operation block 821, where the AP receives a request to join from an STA (e.g., 220 of FIG. 2). Next, the AP establishes an association with the STA at operation block 822, and sets a default maximum RX PPDU duration for the STA (at operation block 824). At control operation block 825, the AP checks whether a maximum RX PPDU duration value is received from the STA. If the answer is no, the control is passed to operation block 828. Otherwise, the AP proceeds with updating the maximum RX PPDU duration for the STA (operation block 826). Next, at operation block 828, the AP prepares DL transmission (frames) for the STA using the maximum RX PPDU duration, that is, frames that have a duration that does not exceed the value of the maximum RX PPDU duration. Finally, at operation block 830, the AP sends the prepared DL frames to the STA.

Figure 9:
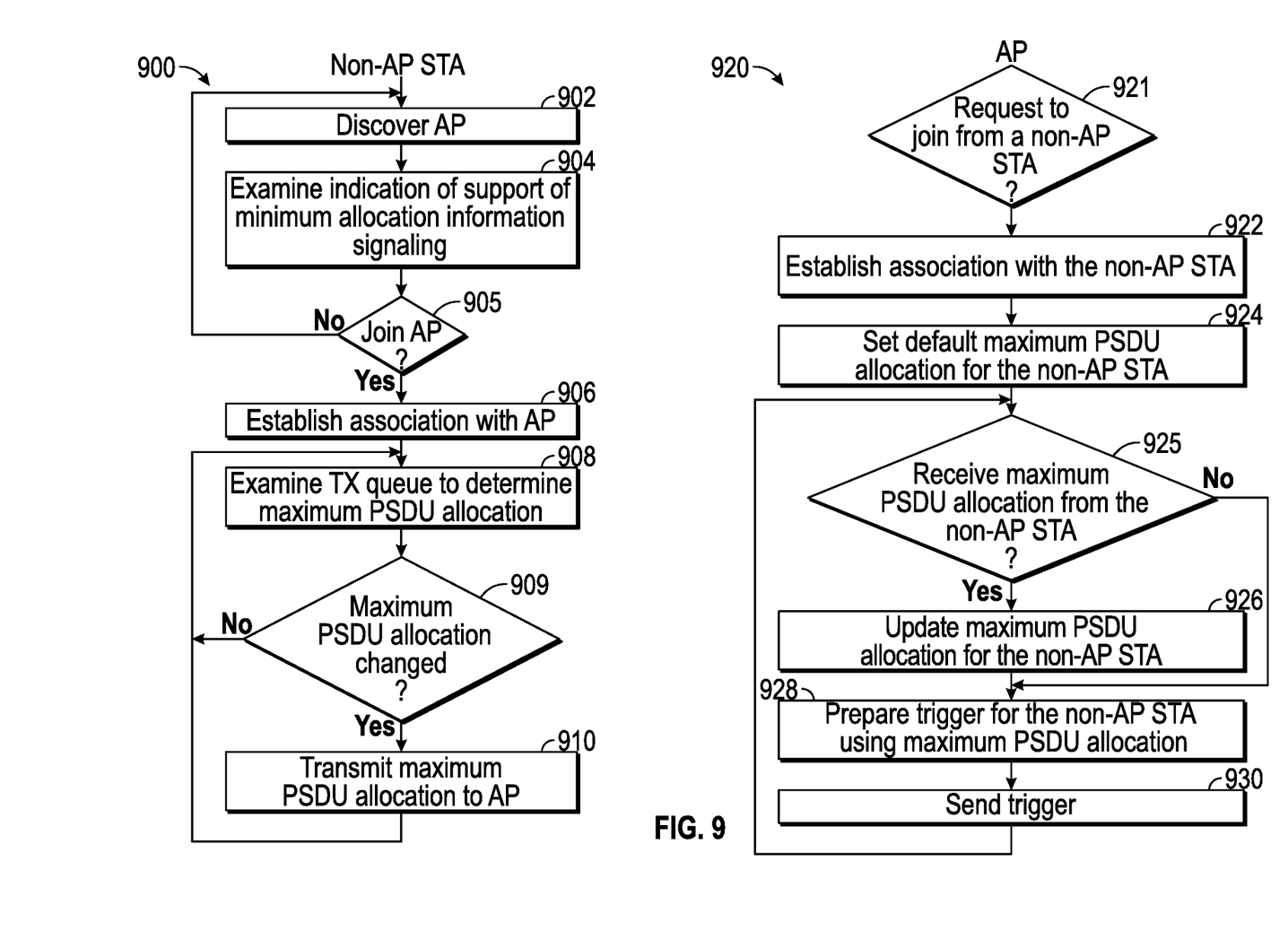
FIG. 9 illustrates flow diagrams of an example use of maximum PSDU allocation for a non-AP station and an AP, in accordance with one or more implementations of the subject technology.

FIG. 9 illustrates flow diagrams 900 and 920 of an example use of maximum PSDU allocation for an STA and an AP, in accordance with one or more implementations of the subject technology. The flow diagram 900 describes the use of maximum PSDU allocation by an STA (e.g., 220 of FIG. 2) and starts at operation block 902, where the STA tries to discover an AP (e.g., 210 of FIG. 2). Following the discovery of the AP, the STA, at operation block 904, examines an indication of the support of the minimum PSDU allocation information signaling by the AP. At control operation block 905, the STA decides whether to join the discovered AP. If the decision is to not join the AP, the control is passed to operation block 902. Otherwise, the STA proceeds with establishing an association with the AP (operation block 906). Next, at operation block 908, the STA examines the TX queue to determine the maximum PSDU allocation. At control operation block 909, the STA determines whether the maximum PSDU allocation has changed. If the answer is no, the control is passed to the operation block 908. Otherwise, at operation block 910, the STA transmits a trigger to the STA that contains an allocation that does not exceed the maximum PSDU allocation to the AP.

The flow diagram 920 describes the use of the maximum PSDU allocation by an AP (e.g., 210 of FIG. 2) and starts at operation block 921, where the AP receives a request to join from an STA (e.g., 220 of FIG. 2). Next, the AP establishes an association with the STA, at operation block 922, and sets a default maximum PSDU allocation for the STA (at operation 924). At control operation block 925, the AP checks whether a maximum PSDU allocation value is received from the STA. If the answer is no, the control is passed to operation block 928. Otherwise, the AP proceeds with updating the maximum PSDU allocation for the STA (operation block 926). Next, at operation block 928, the AP prepares a trigger for the STA using the maximum PSDU allocation, that is a trigger that contains an allocation which accommodates a number of bytes that does not exceed the maximum PSDU allocation value for that STA. Finally, at operation block 930, the AP sends the prepared trigger to the STA.

Figure 10A:
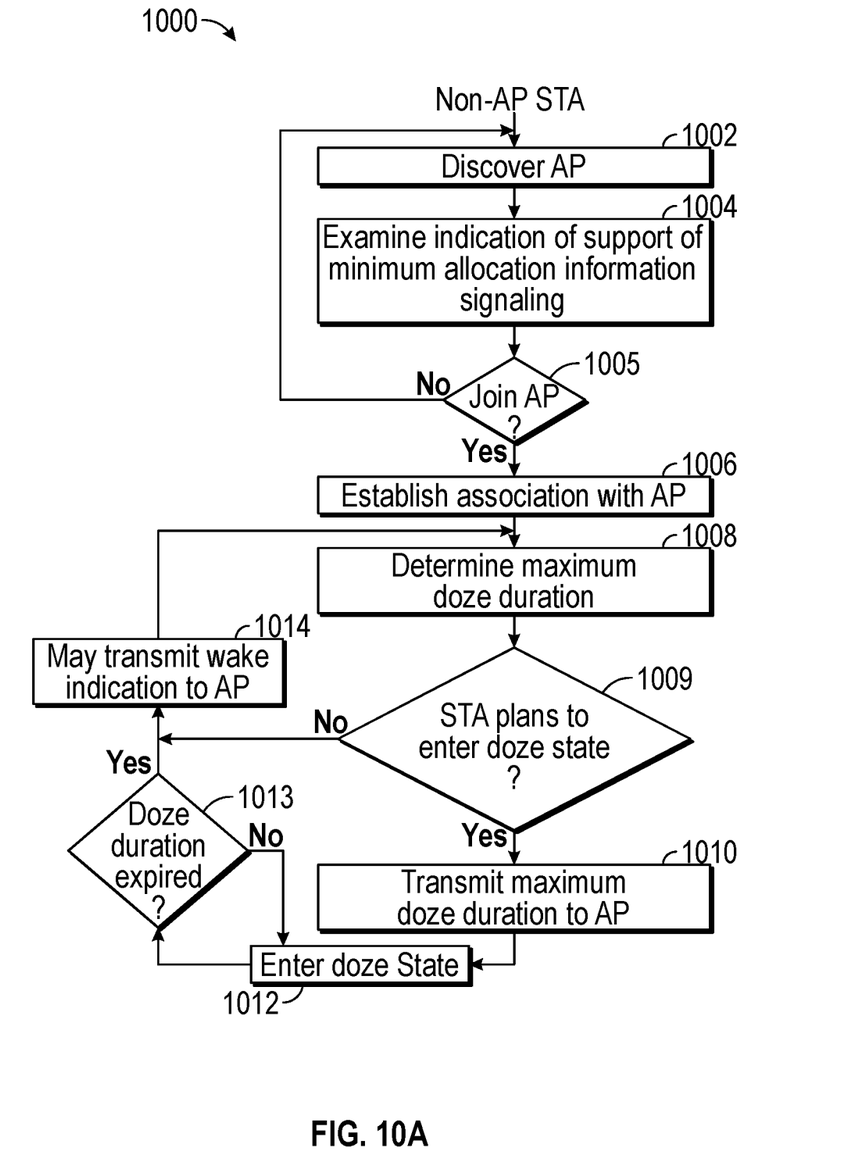
FIGS. 10A and 10B illustrate flow diagrams of an example use of maximum doze duration for a non-AP station and an AP, in accordance with one or more implementations of the subject technology.
Figure 10B:
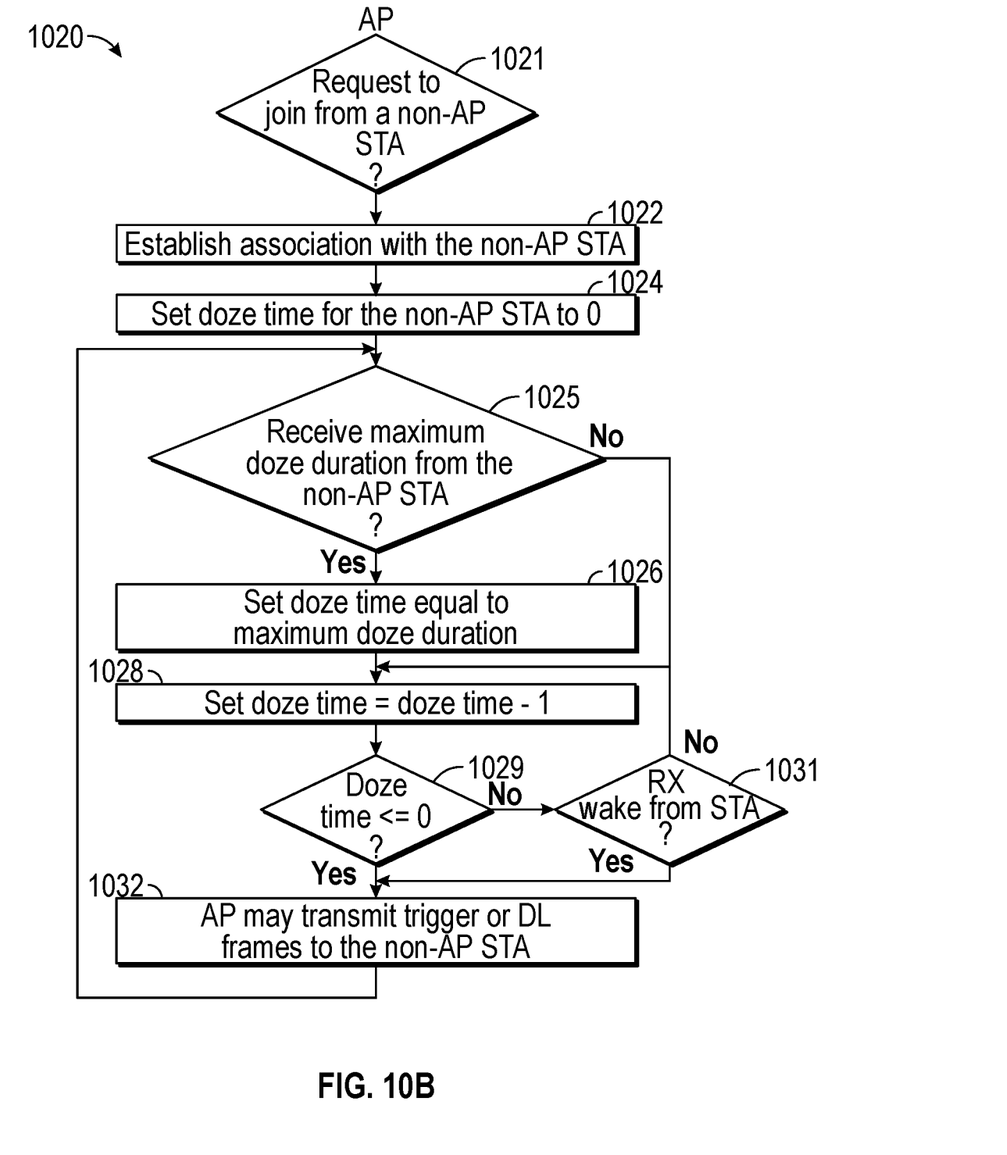

FIGS. 10A and 10B illustrate flow diagrams 1000 and 1020 of an example use of maximum doze duration (e.g., 256 µs) for a non-AP station and an AP, in accordance with one or more implementations of the subject technology. The flow diagram 1000 describes the use of maximum doze duration by an STA (e.g., 220 of FIG. 2) and starts at operation block 1002, where the STA tries to discover an AP (e.g., 210 of FIG. 2). Following the discovery of the AP, the STA, at operation block 1004, examines an indication of the support of the minimum allocation information signaling by the AP. At control operation block 1005, the STA decides whether to join the discovered AP. If the decision is to not join the AP, the control is passed to operation block 1002. Otherwise, the STA proceeds with establishing an association with the AP (operation block 1006). Next, at operation block 1008, the STA determines maximum doze duration. At control operation block 1009, the STA decides whether to enter the doze state. If the decision is to not enter the doze state, the control is passed to the operation block 1014, where the STA may transmit wake indication to the AP. Otherwise, at operation block 1010, the STA transmits the maximum doze duration to the AP. Next, at operation block 1012, the STA enters the doze state and the control is passed to the control operation block 1013, where it is checked to see whether the doze duration is expired. If the doze duration is expired, the control is passed to operation block 1014. Otherwise, the control is passed to the operation block 1012.

The flow diagram 1020 describes the use of the maximum doze duration by an AP (e.g., 210 of FIG. 2) and starts at operation block 1021, where the AP receives a request to join from an STA (e.g., 220 of FIG. 2). Next, at operation block 1022, the AP establishes an association with the STA, and sets the doze time for the STA (at operation block 1024).

At control operation block 1025, the AP checks whether a maximum doze duration value is received from the STA. If the answer is no, the control is passed to operation 1028. Otherwise, the AP sets the doze time equal to the received maximum doze duration (operation block 1026). Next, at operation block 1028, the AP decrements the doze time by one. At control operation block 1029, the AP checks whether the doze time is less than or equal to zero. If the doze time is not less than or equal to zero the control is passed to control operation block 1031. At control operation block 1031, if an RX wake is received from the STA, the control is passed to operation block 1032; otherwise the control is passed to operation block 1028. If, at operation block 1029, it is determined that the doze time is less than or equal to zero, the control is passed to operation block 1032. At operation block 1032, the AP may transmit a trigger or DL frames to the STA.

Figure 11:
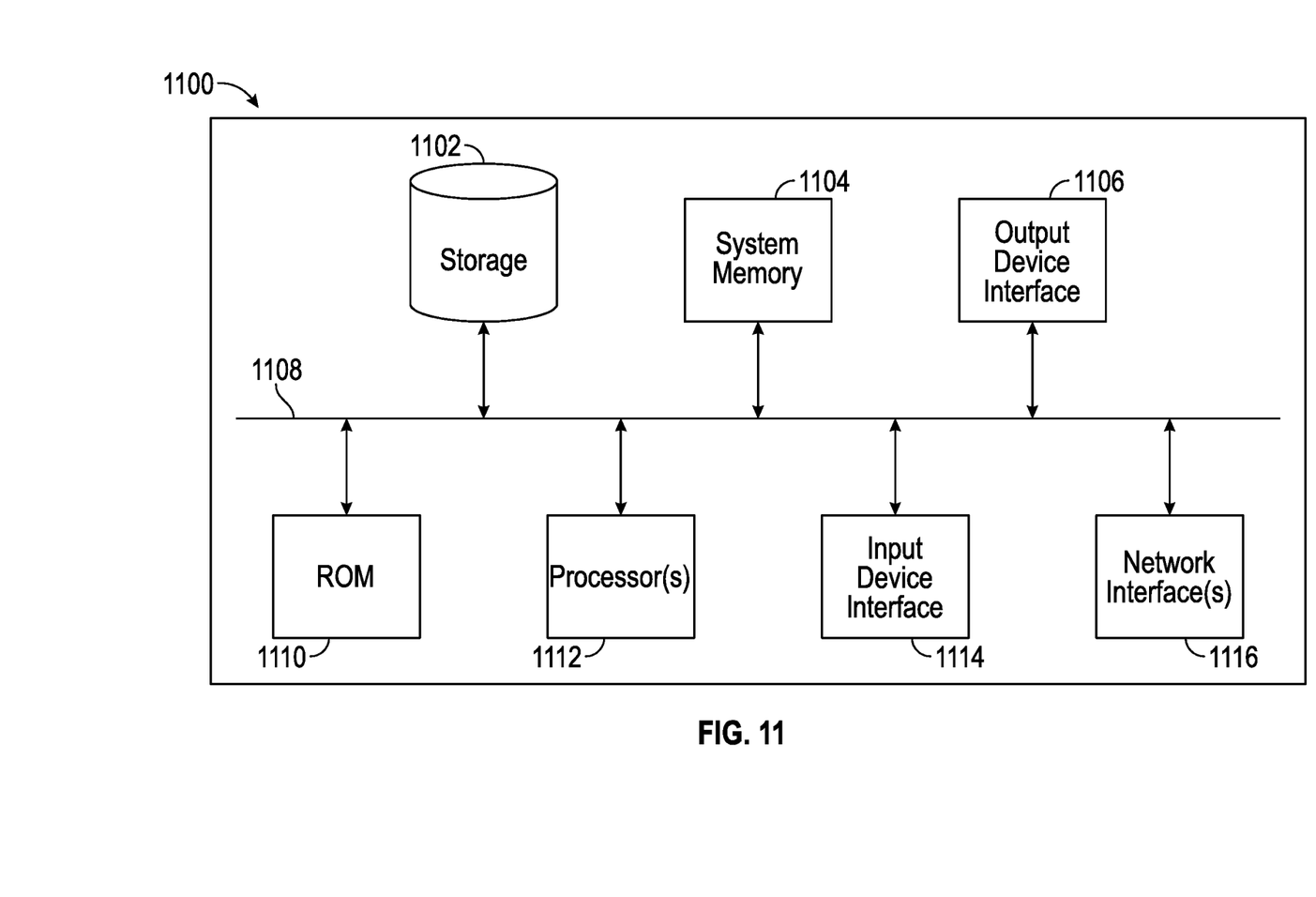
FIG. 11 conceptually illustrates an electronic system within which one or more aspects of the subject technology are implemented.

FIG. 11 conceptually illustrates an electronic system within which one or more aspects of the subject technology are implemented. The electronic system 1100, for example, can be a network device, a media converter, a desktop computer, a laptop computer, a tablet computer, a server, a switch, a router, a base station, a receiver, a phone, or generally any electronic device that transmits signals over a network. The electronic system 1100 includes a bus 1108, a permanent storage device 1102, a system memory 1104, an output device interface 1106, a read-only memory (ROM) 1110, one or more processing units 1112, an input device interface 1114 and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing units 1112 with the ROM 1110, the system memory 1104, and the permanent storage device 1102. From these various memory units, the one or more processing units 1112 retrieves instructions to execute and data to process in order to execute the processes of the subject disclosure. The one or more processing units 1112 can be a single processor or a multi-core processor in different implementations.

The ROM 1110 stores static data and instructions that are needed by the one or more processing units 1112 and other modules of the electronic system. The permanent storage device 1102, on the other hand, is a read-and-write memory device. The permanent storage device 1102 is a nonvolatile memory unit that stores instructions and data even when the electronic system 1100 is off. One or more implementations of the subject disclosure use a mass storage device (such as a magnetic or optical disk and its corresponding disk drive) as the permanent storage device 1102.

Other implementations use a removable storage device (such as a floppy disk or flash drive, and its corresponding disk drive) as the permanent storage device 1102. Like the permanent storage device 1102, the system memory 1104 is a read-and-write memory device. However, unlike the permanent storage device 1102, the system memory 1104 is a volatile read-and-write memory, such as random access memory. System memory 1104 stores any of the instructions and data that the one or more processing units 1112 needs at runtime. In one or more implementations, the processes of the subject disclosure are stored in the system memory 1104, the permanent storage device 1102, and/or the ROM 1110. From these various memory units, the one or more processing units 1112 retrieve instructions to execute and data to process in order to execute the processes of one or more implementations.

The bus 1108 also connects to the input device interface 1114 and the output device interface 1106. The input device interface 1114 enables a user to communicate information and select commands to the electronic system. Input devices used with the input device interface 1114 include, for example, alphanumeric keyboards and pointing devices (also called "cursor control devices"). The output device interface 1106 enables, for example, the display of images generated by the electronic system 1100. Output devices used with the output device interface 1106 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 11, the bus 1108 also couples the electronic system 1100 to one or more networks (not shown) through one or more network interfaces 1116. In this manner, the computer can be a part of one or more networks of computers, such as a peer-to-peer network, a LAN, a wide area network (WAN), or an intranet, or a network of networks, such as the Internet. Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be nontransitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any nonvolatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any nonsemiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without changing the underlying logic, function, processing, and output.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A wireless access point comprising:
a memory; and
a processor coupled to the memory, the processor configured to:
identify a station (STA) of a plurality of STAs to which a trigger frame is to be sent by the access point (AP);
determine amounts of resources to be provided by the AP to the identified STA through the trigger frame; and
determine a frequency of sending the trigger frame to the identified STA based at least on information received from the identified STA,
wherein the resources comprise a frequency allocation, a time duration and a modulation coding scheme, and
wherein the time duration comprises a maximum receive (RX) physical-layer convergence protocol (PLCP) protocol data unit (PPDU) duration.

2. The access point of claim 1, wherein the frequency of sending the trigger frame is within a range of about 5 milliseconds (ms) to 30 ms, and wherein the AP is configured to limit a time duration of a transmission of a PPDU to the STA to the maximum RX PPDU.

3. The access point of claim 1, wherein the trigger frame comprises a medium access control (MAC) frame having a MAC header section including a high-throughput (HT) control field.

4. The access point of claim 3, wherein the HT control field or a variant of the HT control field includes a minimum PLCP service data unit (PSDU) allocation information.

5. The access point of claim 4, wherein the processor is configured to provide a combination of upload transmit parameters through the trigger frame to the STA to allow transmission by the STA of a PSDU containing a plurality of bytes that is at least equal to a minimum PSDU allocation indicated by the STA.

6. The access point of claim 5, wherein the processor is configured to receive the maximum RX PPDU duration, a maximum PSDU allocation and a maximum doze duration from the STA.

7. The access point of claim 5, wherein the processor is configured to prepare and transmit downlink frames to the STA, each downlink frame having a duration that is less than or equal to the maximum RX PPDU duration indicated by the STA.

8. The access point of claim 7, wherein the processor is configured to prepare and send a trigger to the STA providing a combination of upload transmit parameters to allow transmission by the STA of a PSDU containing a number of bytes that is no more than the maximum PSDU allocation indicated by the STA.

9. The access point of claim 7, wherein the processor is configured to avoid transmission of downlink frames and trigger frames to the STA before an expiration of the maximum doze duration.

10. A method comprising:
identifying, by an access point (AP), a station (STA) of a plurality of STAs for transmission of a trigger frame;
determining, by the AP, amounts of resources to be provided by the AP to the identified STA through the trigger frame;
determining a frequency of sending the trigger frame to the identified STA based at least on information received from the identified STA; and
limiting, by the AP, a time duration of a transmission of a physical-layer convergence protocol (PLCP) protocol data unit (PPDU) to the STA to a maximum receive (RX) PPDU duration,
wherein:
the resources include a frequency allocation, a time duration and a modulation coding scheme, and
the AP communicates with the STA via a wireless local-area network (WLAN).

11. The method of claim 10, further comprising determining, by the AP, a combination of upload transmit parameters transmitted to the STA through the trigger frame to the STA that allow transmission by the STA of a PSDU containing a number of bytes that is at least equal to a minimum PSDU allocation indicated by the STA.

12. The method of claim 10, further comprising receiving, by the AP, the maximum RX PPDU duration, a maximum PSDU allocation and a maximum doze duration from the STA.

13. The method of claim 12, further comprising transmitting downlink frames to the STA with a duration that is limited to not exceed the maximum RX PPDU duration.

14. The method of claim 12, further comprising transmitting a trigger to the STA containing an allocation that does not accommodate the transmission of a number of bytes that exceeds a value of the maximum PSDU allocation indicated by the STA.

15. The method of claim 12, further comprising avoiding transmission of downlink frames and trigger frames to the STA before an expiration of the maximum doze duration.

* * * * *